F. F. BRUCKER.
TOOL.
APPLICATION FILED FEB. 13, 1915.
1,159,646.
Patented Nov. 9, 1915.
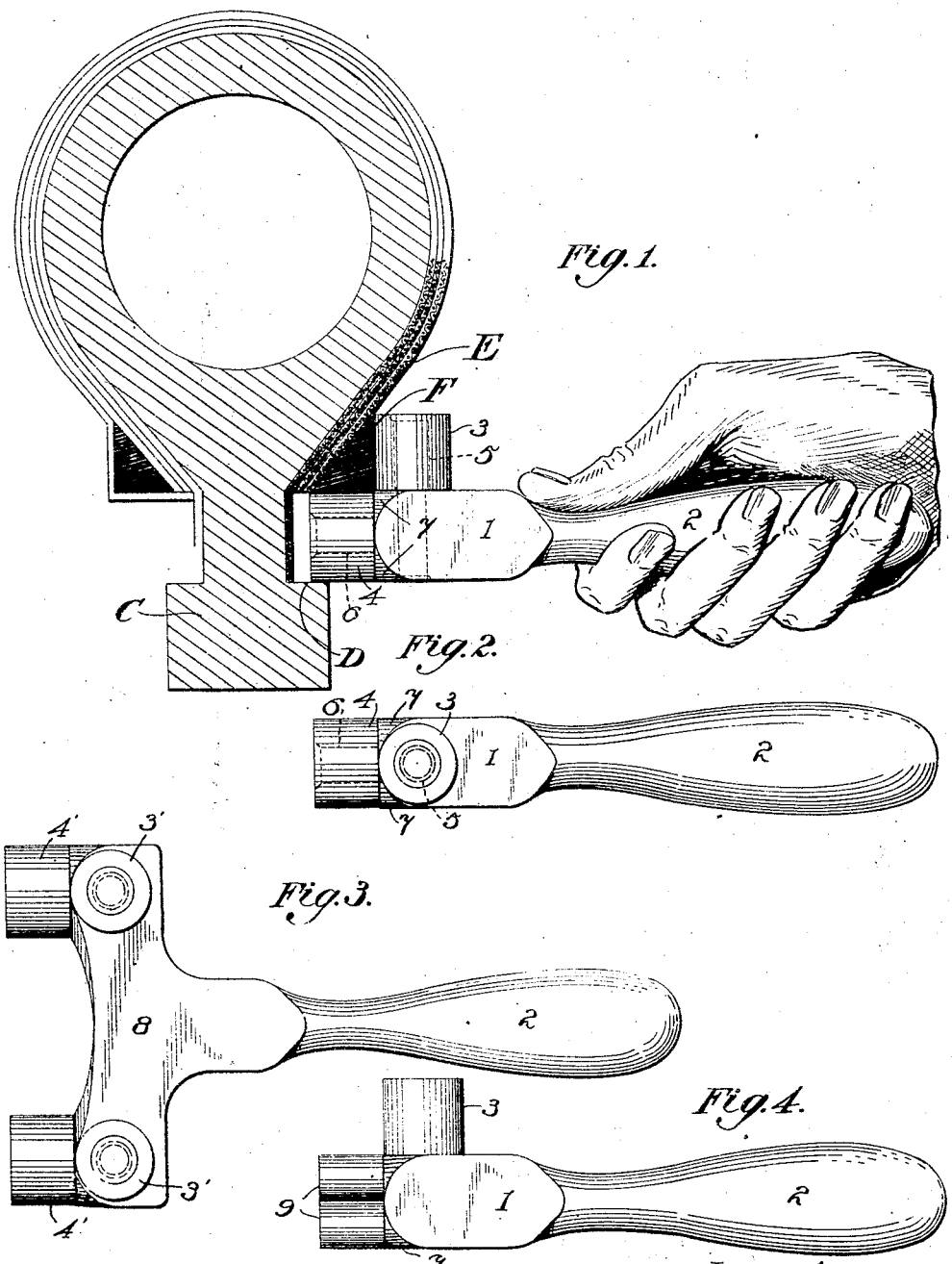
Inventor:
Ferdinand F. Brucker.
by Charles E Parsons
Atty.

UNITED STATES PATENT OFFICE.

FERDINAND FRANCIS BRUCKER, OF AKRON, OHIO, ASSIGNOR TO MILLER RUBBER CO., OF AKRON, OHIO, A CORPORATION OF OHIO.

TOOL.

1,159,646.

Specification of Letters Patent. Patented Nov. 9, 1915.

Application filed February 13, 1915. Serial No. 8,123.

*To all whom it may concern:*

Be it known that I, FERDINAND F. BRUCKER, citizen of the United States, residing at Akron, in the county of Summit and State of Ohio, have invented certain new and useful Improvements in Tools, of which the following is a specification.

The present invention relates to hand tools, and pertains more particularly to a tool such as is adapted to be used to press the beads into place in the construction of tire casings.

The object of the invention is to provide a simple tool of the class referred to which will take the place of the circular bead fitting ring formerly used.

Experience has shown that in using the bead fitting ring when the beads are of the inextensible type, that is, containing wires, it was almost impossible to construct all of the beads so that they would pass over the rings perfectly, and often in the removal of the pressing rings the bead would be pulled away from the tire. Another difficulty with the circular bead ring is that all of the bead rings of one size must fit all of the cores of one size or else much time is consumed in trying to put them on and take them off.

The present invention contemplates providing a simple tool which can be held in the hand and pressed against the bead, thus obviating the various difficulties above set forth.

With these and other objects in view, the invention consists in the combination and arrangement of parts hereinafter described and particularly defined by the appended claims.

In the drawings Figure 1 is a side elevation of the device showing the manner in which it is used in applying a bead to a tire casing; Fig. 2 is a detail plan view of the device; Fig. 3 is a plan view of a modification; and Fig. 4 is a side elevation of a further modification.

Referring now to the drawings, the device as illustrated in Figs. 1 and 2 consists of a piece of metal 1 of square cross section, one end of which is shaped to form a handle 2, or might be otherwise formed if it were found desirable to work the tool mechanically. The square end of the tool carries two rollers 3 and 4, placed at right angles to each other and fastened to the tool by studs 5 and 6, upon which they are free to revolve. These rollers 3 and 4 are shaped to fit two sides of the bead which is to be placed upon the tire. The roller 4 is made of such diameter as to exactly fill in the space between a shoulder D on the core and the correct position of the bead F of the tire, see Fig. 1. The rollers 3, 4, may be made of various shapes suitable for different shaped beads. It will be seen that in the form of tool disclosed in Figs. 1 and 2 the roller 4 is placed at the end of the square part of the tool and in a line with the handle, whereas the roller 3 is carried from one side at right angles thereto. The corners of the squared end of the tool are rounded as at 7 so as to prevent any scraping upon the bead which might injure it.

In operation the device is used in the following manner: The bead F, which is in the form of a ring, is dropped between the rollers 4 and 3, and the tool is then placed against the core C with the roller 4 next to and resting against the shoulder D. The core is then moved either by hand or by power, and the tool presses the bead down against the fabric E, where it is retained by the adhesive action of the uncured rubber with which the bead F and the fabric E are coated. The bead F may be also fed over the rollers 4 and 3 in a continuous strip, and cut to length after the core C has made one revolution, then rolled into place by revolving the core several more revolutions while retaining the tool in place.

Referring to Fig. 3, a modified form of the invention is shown in which a cross piece 8 is formed integral with and at right angles to the handle 2. This portion 8 is substantially square in cross section, and carries at each end a roller 4' mounted upon a stud having its axis parallel to the handle 2. Rollers 3' are also provided one at each end, being carried upon studs in one face of the cross piece 8, and having their axes disposed at right angles to the rollers 4'. The outer edges of the cross piece 8 between the rollers 4' are slightly rounded so as to prevent scraping against the bead. It will be seen that this tool is adapted to be used in exactly the same manner as the form illustrated in Figs. 1 and 2, but that it possesses the further advantage of having double bearing points upon the two sides of the bead F. This would tend to do away with any twisting strain that would come upon the operator's hand, and would enable the device to be held more steadily than with such as shown in the other form.

Referring now to Fig. 4, a still further modification is shown in which the roller 4 at the end of the tool is replaced by a pair of rollers 9 each of half the diameter of the roller 4 shown in Fig. 1. The two rollers 9 are loosely carried on studs secured in the end of the tool, and are adapted to just barely contact with each other as they revolve. It will thus be seen that in using the tool in the recess between the shoulder D of the core and the lower edge of the bead F, two surfaces are presented by the outer circumferential edges of the two rollers 9, which tend to move in opposite directions as the core and bead are rotated. I do not limit myself to the exact forms herein described, but wish to avail myself of any modifications that would properly fall within the spirit of my invention.

What I claim is:—

1. In a tool adapted for use in applying beads to a tire casing, the combination with a handle, of anti-frictional means carried thereon at one end adapted to bear on two adjacent sides of the bead.

2. In a tool adapted for use in applying beads to a tire casing, the combination with a handle, of anti-frictional means at one end thereof comprising rollers, one of said rollers having its axis parallel and co-extensive with the handle axis and another having its axis disposed at right angles thereto.

3. In a tool adapted for use in applying beads to a tire casing, the combination with a handle, of roller pressing means at one end thereof, comprising a set of rollers having their axes parallel with the handle axis and other rollers adjacent thereto and having their axes disposed at right angles to the handle axis.

In testimony whereof I affix my signature in presence of two witnesses.

FERDINAND FRANCIS BRUCKER.

Witnesses:
RUSSELL D. BELDEN,
C. A. WOLF.